United States Patent Office 2,933,430
Patented Apr. 19, 1960

2,933,430

LIPOIC ACID COMPOSITIONS

Hans R. Rosenberg, Wilmington, Del., assignor to E. I. du Pont de Nemours and Company, Wilmington, Del., a corporation of Delaware No Drawing. Application January 22, 1959
Serial No. 788,266

8 Claims. (Cl. 167—53)

This invention relates to novel compositions of matter in which at least one of the active ingredients is lipoic acid or a compound related thereto.

The compositions of this invention comprise an organic compound of molecular weight not exceeding 500 and of the formula (1) $\quad$ R—R'—COR'' wherein R is

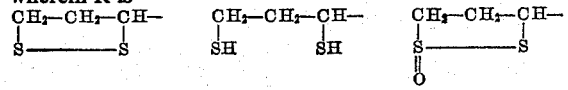

or

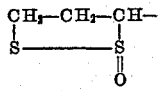

or C-alkyl derivatives thereof in which the alkyl groups contain not more than 4 carbon atoms, R' is a divalent hydrocarbon radical of up to 8 carbon atoms and R'' is —OH or a group hydrolyzable thereto.

According to my invention, a therapeutic composition is prepared in which an organic compound of Formula 1 is the primary therapeutically active ingredient. The compound can be associated with a carrier which can be either a solid material or a sterile parenteral liquid.

Illustrative of organic compounds of Formula 1 are the following:

5-(1,1-dithiolane-3-yl)pentanoic acid (alpha-lipoic acid)
5-(5-methyl-1,2-dithiolane-3-yl)pentaonic acid
Ethyl-1,2-dithiolane-3-yl-formate
4-tert.butyl-5(1,2-dithiolane-3-yl)pentanoamide
2-(1,2-dithiolane-3-yl)acetic acid
3-(1,2-dithiolane-3-yl)propionic acid
6-(1,2-dithiolane-3-yl)hexanoic acid
9-(1,2-dithiolane-3-yl)nonanoic acid
4-methyl-4-ethyl-4-(1,2-dithiolane-3-yl)butyric acid
Oxidized 5-(1,2-dithiolane-3-yl)pentanoic acid (beta-lipoic acid)
6,8-dimercaptooctanoic acid
6,8-dimercaptononanoic acid
Ethyl-2,4-dimercaptobutyrate
4-tert.butyl-6,8-dimercaptooctanoamide
3,5-dimercaptopentanoic acid
4,6-dimercaptohexanoic acid
7,9-dimercaptononanoic acid
10,12-dimercaptododecanoic acid
4-methyl-4-ethyl-5,7-dimercaptoheptanoic acid
Sodium salt of 6,8-dimercaptooctanoic acid It will be understood that the organic compounds of Formula 1 are substituted dithiolanes in which one of the substituents carries a carboxyl group, the corresponding oxidized forms in which one atom of oxygen is attached to the disulfide ring, and the corresponding reduced forms in which the dithiolane rings is open to give a dimercaptan. The compositions of the present invention are generic to all of these "lipoic acid" compounds.

As normally prepared lipoic acids are characterized by the absence of optical activity in that they are the racemic forms, the dl-mixture. It has been found that the free acids and suitable salts thereof such as, for instance, the sodium salt, the potasium salt, or the calcium salt, are usually superior to other acid derivatives in compositions of the invention and for this reason the free acids and salts are preferred.

The organic compounds contained in the compositions of this invention can be prepared by the methods of copending U.S. applications, Serial No. 325,236, filed December 10, 1952, now Patent No. 2,752,374, by Donald S. Acker and Charles W. Todd, Serial No. 325,237, filed December 10, 1952, now Patent No. 2,752,373, by Donald S. Acker. Oxidation of the 1,2-dithiolanyl ring is readily effected by treating the products of the aforementioned Acker applications with tertiary butyl hydroperoxide. This results in the addition of one atom of oxygen to the disulfide ring.

The compositions of the invention may take the form of tablets, powders, capsules, or other dosage forms. Liquid diluents are employed in sterile conditions for parenteral use, that is, by injection. Such a medium may be a sterile solvent such as isotonic saline. The compositions may take the form of the active material—lipoic acid—admixed with solid diluents and/or tableting adjuvants such as corn starch, lactose, talc, stearic acid, magnesium stearate, sugar, gums, or the like.

Any of the tableting materials used in pharmaceutical and veterinarian practices may be employed where there is no incompatibility with the lipoic acid. The material may be tableted with or without adjuvants. Alternatively, lipoic acid with its adjuvant material may be placed in the usual capsule, such as the gelatin capsule, and is administered in that form.

In yet another embodiment my therapeutic compositions may be put into powder packets and employed, or the composition may be prepared in the form of a suspension in a material in which the "lipoic acid" compound is not soluble.

Of the solid medicinal carriers I prefer to use a vitamin material. The vitamin can be a vitamin B complex material, such as yeast, liver, cereals or mixtures thereof, or mixtures of synthetic vitamin materials such as thiamine hydrochloride, riboflavin, nicotinic acid or its amide, with or without the addition of other B vitamins, such as pyridoxamine hydrochloride, calcium pantothenate and inositol, or synthetic vitamin mixtures in the proportions found in natural vitamin complexes. The vitamin can be any of the known vitamin substances such as, for instance, vitamin E or C.

The novel compositions of this invention contain from about 0.5 to about 50 mg. of the "lipoic acid" compound of Formula 1. It will be noted and obvious to persons skilled in the art that the particular amount within this range will depend on the attendant circumstances and the nature of the effect desired.

I have found that the percentage of lipoic acid in the compositions of the invention may be 10% or 20% or higher. For example, tablets may be prepared with a minor proportion of diluent and a major proportion of active material. Tablets containing from about 10 to about 50 mgs. of active ingredient are particularly useful.

The compositions of this invention have several important utilities, as will be clearly illustrated from the examples which appear below.

For example, I have found that the reproductivity characteristics of rats are greatly improved when the compositions of this invention are added to their diet. Since the business of growing rats for laboratory test purposes now amounts to over eight million dollars annually in the United States alone, this use has important economic significance. In Examples 1 and 2, it will be noted that comparative tests show an outstanding increase in the number of offspring from female rats fed the novel compositions of this invention as compared with other female rats not receiving such compositions.

*Example 1*

In a comparative test, a breeding study is carried out using 10 female rats, housed individually, for each of two controlled dietary treatments. All of the animals are kept on their respective diets from weaning on. Females are mated, using ten males, when 3 months old, one female with each male. Males and females are kept together for a two-week period.

The basal diet has the following composition: casein, 25%; sucrose, 55%; lard, 10%; salt mixture, 5% (salt mixture No. V, according to G. M. Briggs et al., Proc. Soc. Biol. Mdc. 81, 113 (1952)); cod liver oil, 1%; and vitamin mixture, 4%. This mixture supplies the vitamins in the following amounts per kg. of diet: Thiamine, 5 mg.; phridoxine, 5 mg.; riboflavin, 10 mg.; nicotinic acid, 20 mg.; calcium pantothenate, 50 mg.; menadione, 10 mg.; folic acid, 0.5 mg.; biotin, 0.5 mg.; inositol, 1000 mg.; para-aminobenzoic acid, 1000 mg.; and choline chloride, 1500 mg.

One group of 10 females receives the basal diet only. The second group of 10 females receives, in addition to the basal diet, 0.5 mg. of alpha-lipoic acid three times per week. In the group of rats that receives no lipoic acid, none of the females become pregnant, and no reproduction occurs. In the group of rats that receives lipoic acid, six of the 10 females become pregnant. An average of 9 pups per female are born. The litter size is reduced to seven at three days of age. At weaning (21 days) the average weight of the young is 35.2 grams.

*Example 2*

In a second comparative experiment, using two groups of ten female rats each as in Example 1, only five male rats are used, mating two females per male and keeping the males and females together for a three-week period. The same basal diet and the same dosage of alpha-lipoic acid are used as in Example 1.

As results, in the group of rats that receives no lipoic acid, none of the females become pregnant, and no reproduction occurs. In the group of rats that receives lipoic acid, eight females become pregnant. There is an average of 7.4 pups born per litter. The litter size is reduced to seven at three days of age, and the average weaning weight is 42 grams.

In another important utility, the compositions of this invention provide in combination with vitamin C a synergistic effect when administered to guinea pigs. All scorbutic symptoms disappear rapidly when a composition containing such a combination is fed to such animals on a scorbutogenic ration. In the United States, the annual dollar business in experimental test guinea pigs is over 1.8 million dollars. This utility is illustrated more fully by the following Example 3, which shows the vitamin-like efficacy of a composition which contains alpha-lipoic acid and vitamin C upon guinea pigs on scorbutogenic ration.

*Example 3*

A composition containing about 30% alpha-lipoic acid and 70% ascorbic acid is fed to guinea pigs maintained on a scorbutogenic ration over a five week period. The lopoic acid dosage is 0.2 mg./day, or 0.6 mg./kg. body weight/day. During this period the mortality rate is observed to drop from 40% to zero. Concomitant with this observation is the substantially complete absence of scorbutic symptoms in those animals receiving the compositions of lipoic and ascorbic acids in contrast to those not receiving the composition and in contrast to those receiving ascorbic acid alone in the amount contained in the above dosage, that is, 0.5 mg. ascorbic acid per day.

In addition to the above utilities, a remarkable improvement in the growth response of rats is obtained due to the inclusion in their diet of the compositions according to this invention. The following two examples illustrate this point.

*Example 4*

In a comparative test, ten rats are fed a regular commercial lab chow, and a similar second group of ten rats are fed the same commercial lab chow having mixed therein one mg. of alpha-lipoic acid per kg. of diet. A similar third group of animals being fed the same lab chow receive the same amount of alpha-lipoic acid intraperitoneally. At the end of four weeks growth, the following results are observed:

| | Grain, grams |
|---|---|
| Rats receiving lab chow only | 116 |
| Rats receiving lab chow admixed with alpha-lipoic acid | 122.4 |
| Rats receiving lab chow plus alpha-lipoic acid administered intraperitoneally | 130.1 |

*Example 5*

In another comparative test, Example 4 is repeated using twenty female rats for each treatment, with the alpha-lipoic acid administered in the case of the second group as a fresh solution orally every second day. The four week gains are as follows:

| | Gain, grams |
|---|---|
| Lab chow only | 123.7 |
| Lab chow+5 mg. alpha-lipoic acid/kg. diet administered orally | 127.4 |
| Lab chow+5 mg. alpha-lipoic acid/kg. diet administered intraperitoneally | 130.1 |

Each of Examples 4 and 5 illustrate the significant and beneficial improvement in weight gain realized by the practice of this invention.

As noted above, my compositions may take any of a variety of forms. Various diluents may be employed. Of particular interest is the use of animal feed compositions containing a "lipoic acid" compound. The percentage of active ingredient in my compositions may be varied. It is preferred, however, that the active ingredient constitutes a proportion such that a dosage from 0.05 to 50 mg./kg. animal body weight/day will be obtained.

It will be readily recognized by persons skilled in the art that the practice of this invention requires the use of the active compound in an amount substantially greater than the normal physiological or nutritional requirement of the recipient animal.

Not only is the lipoic acid effective on administration by the oral route, but it is also effective when administered parenterally, that is subcutaneously or intraperitoneally.

Obviously, several unit dosage forms may be administered at about the same time. Although I have found that a percentage of less than 0.1% of the therapeutically active ingredient is effective I prefer to use in my compositions not less than 0.1% of active agent. Activity increases with concentration of the lipoic acid in the composition.

Still another utility for the novel compositions of this invention is in the prophylaxis of warm blooded animals exposed to heavy metal poisoning. This utility is fully disclosed in published literature, see, for example, U.S. Patent No. 2,840,505, issued June 24, 1958, and in particular Examples 1 and 2 of that patent.

This application is a continuation-in-part of my copending application Serial No. 422,244, filed April 9, 1954, now abandoned.

I claim:
1. An article of manufacture, said article being in a form from the group consisting of tablets, powders and capsules, said article comprising as an essential ingredient from about 0.05 to 50 mg. of an organic compound having a molecular weight of not more than 500 and of the formula R—R'—COR" wherein R is a monovalent radical of the class consisting of

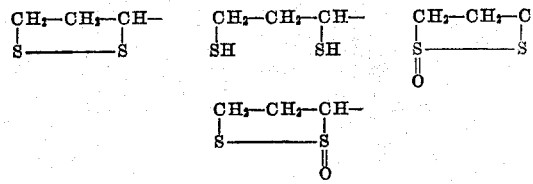

and alkyl derivatives of said radicals wherein said alkyl contains less than five carbon atoms, R' is a divalent hydrocarbon radical of not more than 8 carbon atoms and R" is selected from the class consisting of OH and groups hydrolyzable thereto.

2. The article as set forth in claim 1 wherein said organic compound is 5-(1,2-dithiolan-3-yl)pentanoic acid.

3. The article as set forth in claim 1 wherein said organic compound is 6,8-dimercaptooctanoic acid.

4. The article as set forth in claim 1 wherein said article also includes as an essential adjuvant a vitamin.

5. The article as set forth in claim 4 wherein said vitamin is ascorbic acid.

6. A novel composition of matter comprising (a) as an essential ingredient from about 0.05 to 50 mg. of an organic compound having a molecular weight of not more than 500 and of the formula R—R'—COR" wherein R is a monovalent radical of the class consisting of

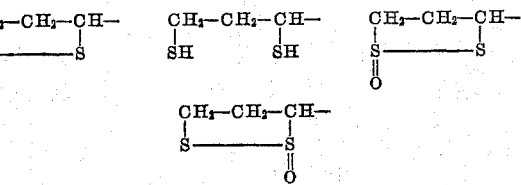

and alkyl derivatives of said radicals wherein said alkyl contains less than five carbon atoms, R' is a divalent hydrocarbon radical of not more than 8 carbon atoms and R" is selected from the class consisting of OH and groups hydrolyzable thereto, and (b) a sterile aqueous injectable solvent carrier.

7. The composition as set forth in claim 6 wherein said organic compound is a hydrolyzable salt of 5-(1,2-dithiolan-3-yl)pentanoic acid.

8. The composition as set forth in claim 6 wherein said organic compound is 6,8-dimercaptooctanoic acid.

References Cited in the file of this patent
UNITED STATES PATENTS

| | | |
|---|---|---|
| 2,706,158 | Searle | Apr. 12, 1955 |
| 2,755,288 | Bullock | July 17, 1956 |

OTHER REFERENCES

Mardones: Acta Physiol. Latinoamer., vol. 3, 1953, pp. 140–143.

Reed: Science, vol. 114, 1951, pp. 93 and 94.

Long: Science Progress, vol. 41, October 1953, p. 660.

Reed: Jour. of Biological Chem., vol. 199, December 1952, pp. 873–888.